April 17, 1951 L. A. DERBY 2,549,295
FISHING ROD
Filed Feb. 28, 1947 2 Sheets-Sheet 1
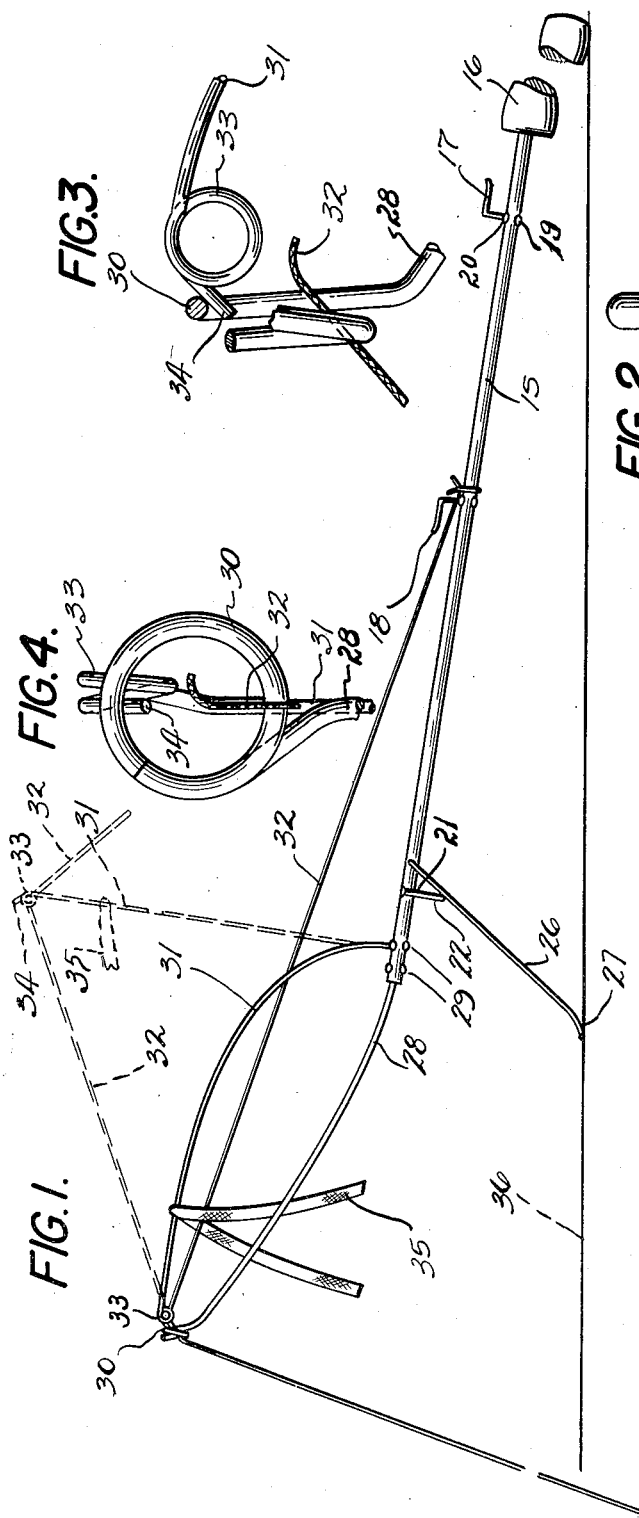
INVENTOR.
LLOYD A. DERBY
BY
ATTORNEY April 17, 1951  L. A. DERBY  2,549,295
FISHING ROD Filed Feb. 28, 1947  2 Sheets-Sheet 2

INVENTOR.
LLOYD A. DERBY
BY
ATTORNEY

Patented Apr. 17, 1951

2,549,295

UNITED STATES PATENT OFFICE 2,549,295

FISHING ROD

Lloyd A. Derby, Adrian, Mich., assignor to Niles Langdon, Toledo, Ohio

Application February 28, 1947, Serial No. 731,524

3 Claims. (Cl. 43—16)

My invention relates to a new and useful improvement in a fishing rod and one particularly adapted for fishing through the ice. In fishing through the ice, it is customary, after a hole has been cut through the ice, to extend the line down into the water through the hole and lay the rod on the ice. This causes the rod to become wet and covered with snow and slush so as to develop an undesirable condition.

It is an object of the present invention to provide a rod so constructed and arranged that it may be used for fishing through the ice and yet held in elevated relation to the ice without requiring the attention of the user.

Another object of the present invention is the provision of a rod having a resilient indicating arm so arranged and constructed that when a fish strikes at the line, the indicating rod will spring into upright position, thus notifying the operator that a strike has been had.

Another object of the invention is the provision of a rod of this type having an indicating arm formed from resilient material and provided with a loop through which the line itself may be passed so that when the indicating rod is tripped, the line will be given a violent jerk.

Other objects will appear hereinafter.

It is recognized that various modifications and changes may be made in the detail of the structure illustrated without departing from the invention and it is intended that such shall be embraced within the scope of the claims which form a part hereof.

Forming a part of this specification are drawings in which,

Fig. 1 is a side elevational view of the invention with a part broken away,

Fig. 2 is an enlarged fragmentary, sectional view taken on line 2—2 of Fig. 1,

Fig. 3 is an enlarged fragmentary, side elevational view of the forward end of the rod with parts broken way, Fig. 4 is a view taken on line 4—4 of Fig. 3.

Figure 5:
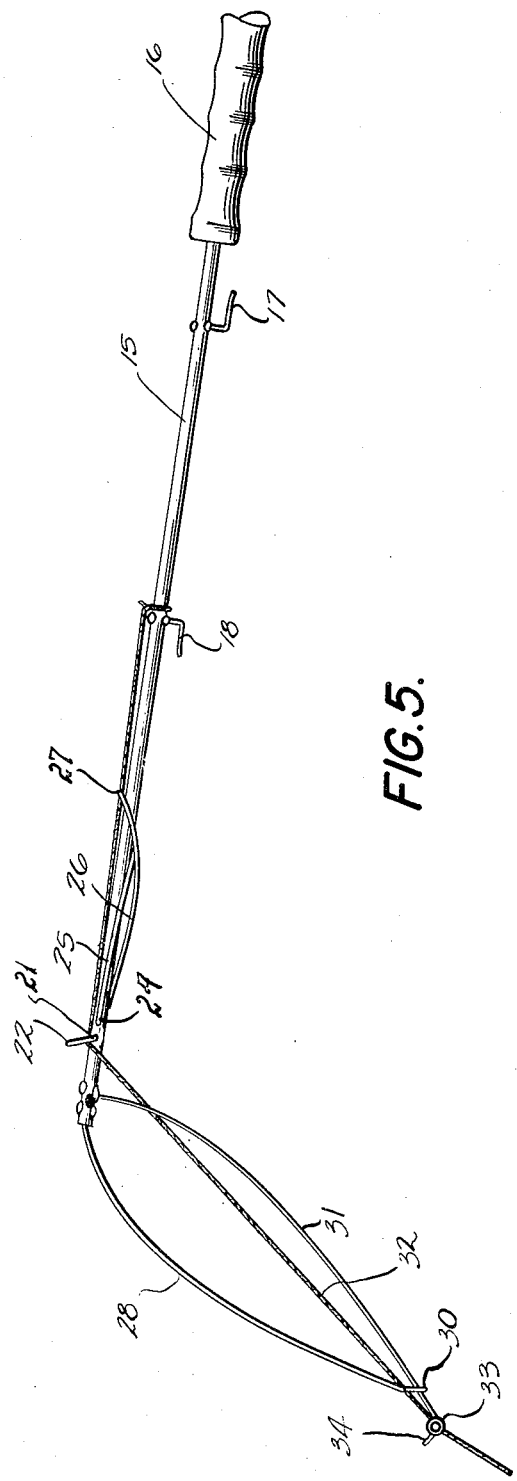
Fig. 5 is a side elevational view of the invention showing it in a different form than that shown in Fig. 1.

In the drawings I have illustrated the invention comprising a rigid rod 15 having a handle or gripping portion 16 mounted on one thereof and provided with a pair of spaced apart brackets 17 and 18 on which the line 32 may be wound when not in use. These brackets 17 and 18 are similarly mounted and extend through the rod 15 which is pinched or crimped, as at 19 and 20, to securely hold the bracket in position.

Extended through the rod 15 adjacent the forward end thereof is a depending yoke 21, each of the legs of which is turned inwardly, as at 22, to provide an abutment.

A wire member 24 is extended through the rod 15 slightly rearwardly of the yoke 21 and angularly turned to provide a pair of supporting legs 25 and 26 each of which is angularly turned at its lower end to provide a foot 27.

The construction is such that when the pole is arranged in the position shown in Fig. 1, the handle 16 of the pole and the supporting feet 27 may be rested upon the supporting surface 36 which may be ice, snow or the like. It will be noted that when in this position, the swingable supporting legs are swung forwardly past center and brought into engagement with the yoke arms at their inturned ends 22 which serves as an abutment and prevents further swinging of the supporting legs. With this construction, the rod is retained elevated from the supporting surface and held free from contact with water, ice, snow and the like.

Inserted into the forward end of the rigid rod 15 is a resilient flexible extension 28 which is pinched or crimped, as at 29, so as to afford a secure connection. The forward end of this resilient extension 28 is wound upon itself to provide a coil or eyelet 30 through which the line 32 may be projected after being suitably tied to the rod 15. Secured at one end to the forward end of the rigid rod 15 is a resilient or spring indicating arm 31 which is wound upon itself at one end to provide an open coil or eyelet 33, the terminal portion of which is extended as at 34 to provide an engaging portion or latch adapted to engage the coil 30. Secured to this arm 31 is a suitable indicator such as a red flag or strip 35.

In use, the arm 31 would be bent downwardly, as shown in Fig. 1, and the engaging portion 34 would be engaged in the coil 30. When a fish would strike on the line 32, the portion 28 would be flexed downwardly so as to disengage the portion 34 from the coil 30 and the arm 31 would swing upwardly into the dotted line position shown in Fig. 1, thus indicating to the user, who may be at a distance, that a strike has been had.

In some States an automatic line is forbidden and in such instances the device would be used as described. In those States where an automatic line is permitted, the operator may drop the line 32 over the open coil 33 so that when a strike is made and the arm 31 swings upwardly into the position shown in Fig. 1, the line 32 will be given a violent jerk at the time the strike is made, thus assisting in hooking the fish.

When it is desired to hold the rod in the hand and use it as an ordinary rod, the eyelet or coil 33, formed on the arm 31, may be projected through the coil or eyelet 30 formed on the arm 28 and the line 32 may then be dropped over the open coil 33 to obtain the position shown in Fig. 5. When in this position, the rod may be used for fishing directly without the telltale indicating arm functioning for indicating purposes. When in this position, the two resilient members 31 and 28 will serve to reinforce each other, thus making it possible to raise a large fish out of the water when the rod 15 is used as a hand rod.

It will be noted that when the structure is in the position shown in Fig. 5, the supporting legs 25 and 26 are crossed over each other to the angularly turned ends 27 which form feet are hooked around the rod 15 to retain this supporting member in a position to lie parallel to the rod 15. This renders the rod more convenient for use as a hand rod and, at the same time, permits the movement of the supporting legs into a compact position when it is desired to pack the rod for transportation.

Experience has shown that a rod constructed in this manner is highly efficient in use and possessing the desired characteristics heretofore mentioned.

What I claim is:

1. In a fishing rod of the class described, a rigid rod having a flexible, resilient extension mounted at one end on said rod and extended forwardly from the forward end thereof; a coil formed on the free end of said flexible extension; a flexible arm of resilient material mounted at one end on said rod and having a coil formed on the opposite end of said arm; an engaging portion extending outwardly from said last named coil and adapted upon flexing of said arm against the resiliency thereof for latching in the coil on said extension and said arm being adapted, upon said engaging portion being released from said coil, to extend outwardly from said rod.

2. In a fishing rod of the class described, a rigid rod having a flexible resilient extension and extended forwardly therefrom; a coil formed on the free end of said flexible extension; a flexible arm of resilient material mounted at one end on said rod and having a coil formed on the opposite end of said arm; an engaging portion extending outwardly from said last named coil and adapted, upon flexing of said arm against the resiliency thereof, for hooking in the coil on said extension and said arm being adapted upon release of said engaging portion from said coil, to extend outwardly from said rod, the coil on said arm being smaller than the coil on said extension and adapted for projecting therethrough and reinforcing said extension.

3. In a fishing rod of the class described, a rigid rod having a flexible, resilient extension extending forwardly therefrom; an eyelet on the free end of said flexible extension; a flexible arm of resilient material mounted at one end of said rod and projecting forwardly therefrom and having an eyelet on the opposite end of said arm; an engaging portion on the free end of said arm adapted, upon flexing of said arm against the resiliency thereof, for engaging the eyelet on said extension, said arm being adapted, upon release of said engagement portion from said eyelet, to extend outwardly from said rod, said eyelet on said extension being sufficiently large for permitting the projection of said eyelet on said arm therethrough, said arm being of greater length than said extension and projecting forwardly thereof upon projection of the eyelet on said arm thru the eyelet on said extension.

LLOYD A. DERBY.

REFERENCES CITED

The following references are of record in the file of this patent:

UNITED STATES PATENTS

| Number | Name | Date |
| --- | --- | --- |
| 783,169 | Ball | Feb. 21, 1905 |
| 999,214 | Filipowski | Aug. 1, 1911 |
| 1,092,548 | Weber | Apr. 7, 1914 |
| 1,317,843 | Wehner et al. | Oct. 7, 1919 |
| 1,996,704 | Hawkinson | Apr. 2, 1935 |

FOREIGN PATENTS

| Number | Country | Date |
| --- | --- | --- |
| 62,781 | Germany | of 1891 |